US012478582B2

(12) United States Patent
Tranchepain et al.

(10) Patent No.: US 12,478,582 B2
(45) Date of Patent: Nov. 25, 2025

(54) METHOD FOR INCORPORATING ORGANIC COMPOUNDS IN SOLUTION WITHIN A HYDROGEL

(71) Applicant: LABORATOIRES VIVACY, Paris (FR)

(72) Inventors: Frederic Tranchepain, Villy le Bouveret (FR); Florence Brunel, Annemasse (FR)

(73) Assignee: LABORATOIRES VIVACY, Paris (FR)

( * ) Notice: Subject to any disclaimer, the term of this patent is extended or adjusted under 35 U.S.C. 154(b) by 295 days.

(21) Appl. No.: 18/013,141

(22) PCT Filed: Jun. 24, 2021

(86) PCT No.: PCT/EP2021/067414
§ 371 (c)(1),
(2) Date: Feb. 3, 2023

(87) PCT Pub. No.: WO2021/260145
PCT Pub. Date: Dec. 30, 2021

(65) Prior Publication Data
US 2023/0218520 A1    Jul. 13, 2023

(30) Foreign Application Priority Data
Jun. 24, 2020  (FR) ...................................... 2006622

(51) Int. Cl.
*A61K 9/06*    (2006.01)
*A61K 31/167*    (2006.01)
*A61K 47/36*    (2006.01)

(52) U.S. Cl.
CPC .............. *A61K 9/06* (2013.01); *A61K 31/167* (2013.01); *A61K 47/36* (2013.01)

(58) Field of Classification Search
CPC ................ A61K 31/445; A61K 9/0019; A61K 2800/91; A61K 31/728; A61K 47/36; A61K 8/4926; A61K 8/735; A61K 2300/00; A61K 31/4458; A61K 47/10; A61K 8/04; A61K 8/49; A61K 8/73; A61K 9/107; A61K 31/245; A61K 47/26; A61K 31/045; A61K 31/135; A61K 31/167; A61K 31/381; A61K 31/40; A61K 31/4453; A61K 31/45; A61K 31/451; A61K 8/345; A61K 8/411; A61K 9/00; A61K 31/165; A61K 47/12; A61K 47/22
See application file for complete search history.

(56) References Cited

U.S. PATENT DOCUMENTS

2015/0232623 A1 *  8/2015  Barg ...................... A61K 8/735
                                                                     514/626

FOREIGN PATENT DOCUMENTS

| FR | 2 983 483 A1 | 6/2013 | |
|----|---|---|---|
| WO | 86/000079 A1 | 1/1986 | |
| WO | 00/046253 A1 | 8/2000 | |
| WO | 2004/092222 A2 | 10/2004 | |
| WO | 2005/067994 A1 | 7/2005 | |
| WO | 2007/128923 A2 | 11/2007 | |
| WO | 2009/071697 A1 | 6/2009 | |
| WO | 2010/015901 A1 | 2/2010 | |
| WO | 2010/052430 A2 | 5/2010 | |
| WO | 2011/086458 A1 | 7/2011 | |
| WO | 2012/104419 A1 | 8/2012 | |
| WO | 2013/185934 A1 | 12/2013 | |
| WO | 2017/036597 A1 | 3/2017 | |
| WO | WO2017/036597 * | 3/2017 | .............. C08J 3/075 |
| WO | 2017/162676 A1 | 9/2017 | |
| WO | 2018/083195 A1 | 5/2018 | |

OTHER PUBLICATIONS

R. F. Boyer (1986) Modern Experimental Biochemistry, Addison-Wesley Publishing Co, Reading (Mass., USA), pp. 73-75.
Klimek, K. et al., "Ion-exchanging dialysis as an effective method for protein entrapment in curdlan hydrogel," Materials Science & Engineering C, vol. 105, No. 110025, 10 pp. 2019.
Kim, S. et al., "Hydrogels: Swelling, Drug Loading, and Release," Pharmaceutical Research, vol. 9, No. 3, pp. 283-290, 1992.
Gauthier, D. Site internet Introductory website to the techniques used in biochemistry—DIALYSIS (online). 2003 [accessed from http://www8.umoncton.ca/umcm-gauthier_didier/siitub/dialyse.html on May 16, 2020].
Barry, C., et al., "Evaluation of the effectiveness of the practice of mesotherapy for aesthetic purposes," pp. 1-62, 2010.
Neufeld, C.H.H., et al., "The Use of Dialysis in Polymer Purification," J. Polym. Sci., Part A-1, vol. 4, pp. 2907-2908, 1966.
Mar. 17, 2021 Written Opinion issued in French Patent Application No. 2006622.
Sep. 22, 2021 International Search Report issued in International Patent Application No. PCT/EP2021/067414.

(Continued)

Primary Examiner — Audrea B Coniglio
(74) Attorney, Agent, or Firm — Oliff PLC

(57) ABSTRACT

A method for incorporating at least one organic compound within a hydrogel, wherein the incorporation is carried out by dialysis, the organic compound being solubilized in the dialysis solution at a concentration equal to or greater than the target concentration.

24 Claims, No Drawings

(56) References Cited

OTHER PUBLICATIONS

Sep. 22, 2021 Written Opinion of the International Searching Authority issued in International Patent Application No. PCT/EP2021/067414.
May 25, 2022 Written Opinion of the International Searching Authority issued in International Patent Application No. PCT/EP2021/067414.
Sep. 29, 2022 International Preliminary Report on Patentability issued in International Patent Application No. PCT/EP2021/067414.

* cited by examiner

METHOD FOR INCORPORATING ORGANIC COMPOUNDS IN SOLUTION WITHIN A HYDROGEL

The invention relates to a method for incorporating organic compounds within a hydrogel, for example, a hyaluronic acid-based hydrogel, these organic compounds being selected from the organic compounds and/or the oligomers.

In the present application, oligomer is used to designate a polymer comprising a chain consisting of a small number of monomer units and having a degree of polymerization (dp) of the oligomer molecules which varies from two to a few tens, preferably in the interval from 2 to 20 ($2 \leq dp \leq 20$).

In the remainder of the application, these organic compounds selected from the organic compounds and/or the oligomers are referred to as organic compounds.

The addition of organic compounds within a hydrogel presents a certain number of difficulties, notably due to the particular physicochemical nature of the hydrogel.

In the context of the present application, "hydrogel" is used to refer to a polymer gel consisting of a three-dimensional network consisting of at least one polymer, which is capable of absorbing a large quantity of water or aqueous solution and which has particular rheological properties notably in terms of viscosity and viscoelasticity.

Said network can be formed by chemical grafting and/or crosslinking by creation of bonds between the polymer chains, these bonds possibly being covalent bonds.

Said network can also be obtained by transitory physical interactions, for example, ionic, hydrophobic or hydrogen bonds.

In general, the incorporation of organic compounds, which can be, for example, active ingredients such as, for example, anesthetics, antioxidants, vitamins, amino acids, vasoconstrictors, vasodilators, antihemorrhagic or hemostatic agents, nonsteroidal anti-inflammatories, antimicrobial agents, hydrating agents or tissue regenerating agents . . . , is carried out in a dedicated step at the end of the gel preparation process when the final polymer concentration in the hydrogel is reached, thus after swelling, which can make said process more complex, notably since it most of the time involves an additional homogenization step or even a step of adjustment of the concentrations.

Now, any homogenization step can give rise to a more or less extensive degradation of the hydrogel (rupture of bonds due to a mechanical stress) and thus alter the rheological properties of the hydrogel.

Also, during homogenization steps which can last several hours, microbial contaminations are possible and will result in the obligation to work under a controlled atmosphere.

Also, homogenization steps which can last several hours will result in an incorporation of oxygen, which can then cause oxidations if the mixing is not carried out under an inert atmosphere.

In addition, concentration gradients, solubility differences or precipitations can be observed, since the homogenization of the hydrogel is difficult due to its rheological properties and its viscosity.

It is difficult to achieve perfect homogeneity of the concentration of organic compound, and the hydrogel can be partially degraded.

The organic compound itself can also result in a potential degradation of the rheological and/or viscoelastic properties of the formulations or of their stability, directly during the addition, or during sterilization phases or over time, for example, during storage. The degradation can be caused by excessive local concentrations which result in a chemical incompatibility between the hydrogel and the organic compound with excessive local concentration. The latter case is an important problem, to the extent that a local degradation will result in an irregular and thus unpredictable injectability.

The organic compound, notably when it is in salified form, can also result in a variation of the pH value of the swelling solution. This pH variation can affect the entire hydrogel or only part of the hydrogel, which would result in variations of the stability as a function of the different pH values.

In the prior art, for example, regarding hyaluronic acid-based hydrogels, a certain number of approaches have been undertaken in order to incorporate an active ingredient in said hydrogels.

The application WO2005067994 in the name of ANIKA THERAPEUTICS, Inc., discloses that active ingredients can be dissolved in a rehydration solvent of dry particles of hyaluronic acid. This incorporation can only be done if dehydrated crosslinked hyaluronic acid particles are available. It is therefore necessary to have carried out a dehydration step beforehand, which encumbers the industrial process.

The application WO2010052430 in the name of ANTEIS S.A. discloses a hyaluronic acid-based composition comprising one or more polyols and lidocaine. From the method mentioned in example 1, it can be deduced that the method for producing the composition based on hyaluronic acid notably comprises a dialysis step, a step of addition of the glycerol, a step of addition of the sorbitol, as well as a step of addition of the lidocaine. In the context of this application, a large number of steps is thus necessary, in addition to the steps of preparation of the hyaluronic acid-based composition without another compound, in order to add the selected active compounds to said composition. These steps of addition are systematically followed by additional steps of mixing and homogenization, which lengthens and complicates the method.

The application WO2012104419 in the name of Q-MED AB discloses the addition, in compositions based on hyaluronic acid, of anesthetic compounds, the anesthetic compound being added by means of a "stock solution" (highly concentrated solution). The addition of anesthetic agent thus requires an additional step in the preparation of the compound based on hyaluronic acid. In addition, in the case of a sparsely soluble compound, preparing a highly concentrated "stock solution" can result in solubilization difficulties and precipitation problems.

The application WO2007128923 in the name of ANTEIS S.A. discloses a method for preparing a biocompatible gel with controlled release of one or more active ingredients as well as its use in the therapeutic and esthetic field. In the method described in this application, the active ingredients are dissolved in a biocompatible alcohol or a mixture of biocompatible alcohols, which is then added to the gel. Thus, the described incorporation involves an obligatory presence of at least one biocompatible alcohol and once again homogenization steps will be necessary.

The application WO2010015901 in the name of ALLERGAN discloses the addition of lidocaine, the latter being preceded by a pH adjustment of the formulation and being carried out after swelling of the gel.

The applications WO2017/036597 and WO2013/185934 in the name of MERZ PHARMA GMBH disclose the addition of a solution of lidocaine, the latter being implemented by incorporation of said solution in the dialysis membranes and not in the dialysis bath. This incorporation method cannot enable equilibrating the concentrations in a satisfactory manner.

In summary, there is a need for the availability of a method for incorporating an organic compound within a hydrogel, having the following advantages/benefits:
the simplest possible addition from a process standpoint;
homogeneity of the concentration of the organic compound in the hydrogel;
addition while modifying the steps of said method as little as possible;
absence of necessity of homogenization of the hydrogel after the incorporation of the organic compound;
no preparation of concentrated "stock solution;"
no adjustment of the concentrations to be provided:
etc.

Conventionally, during the production of hydrogels, a purification step is carried out after any step of chemical modification of the polymer, crosslinking or substitution in order to eliminate the residual reagents, the byproducts of degradation and any other impurity.

The purification step is conventionally carried out by dialysis of the hydrogel, since the impurities often consist of molecules the size of which is less than the size of the pores of the dialysis membranes, these molecules being referred to as "diffusible."

The dialysis is based on the principles governing the diffusion through a semipermeable membrane. The diffusible molecules will pass through the membrane in accordance with the concentration gradient. Thus, there will be a movement of the molecules from the more concentrated side to the less concentrated side. Each chemical species in solution individually undergoes this process.

The purpose of the dialysis is to reduce the concentration of the small molecules or diffusible molecules of a mixture to a very low level. The diffusible molecules will pass through the membrane of the dialysate toward the counter-dialysate. If a dialysis is carried out continuously, an infinite "dilution" will be reached, see, for example, R. F. Boyer (1986) Modern experimental biochemistry, Addison-Wesley Publishing Co, Reading (Mass., USA), pp. 42-44.

The membranes are usually in the form of bags, tubular bags, pockets . . . or simply semi-permeable membranes.

The dialysis membranes are characterized by an exclusion limit ("molecular weight cut-off" or "MWCO") which is the size of the molecules (having a size greater than the limit) which will not be able to pass through the membrane and the size of the molecules (having a size less than the limit) which will be able to pass through.

At equilibrium, the concentrations of each diffusible species will be equal on the two sides of the membrane. If the volume of the liquid outside of the membrane is very large with respect to the volume of the solution to be dialyzed, this equality of the concentrations implies that the majority of the diffusible molecules, in terms of quantity (weight), has in fact come out of the solution. This elimination of the diffusible molecules can be amplified by repeating this process.

There are two types of dialysis:
dialysis in a closed environment, technique in which one gives the diffusible molecules the time to reach an equilibrium on the two sides of the membrane, and
continuous dialysis, the hydrogel is exposed to a continuous flow of dialysis solution, in practice most commonly water or a pH buffer. Since the flow is continuous, the small molecules or diffusible molecules will never be able to reach an equilibrium concentration and will constantly pass or diffuse through the membrane. Thus, it is virtually possible to reach a zero concentration of these diffusible molecules.

During a dialysis in a closed environment, the diffusate is regularly replaced by a freshly prepared dialysis solution.

During a continuous dialysis, the continuous flow is continuously supplied with a dialysis solution.

In an embodiment relating to the two types of dialysis, several dialysis solutions can be used successively during the course of the same dialysis. This will involve, for example, dialysis solutions at different concentrations of organic compound, enabling the incorporation of said organic compound by successive concentration stages.

Similar techniques such as tangential ultrafiltration or ultrafiltration using hollow fiber membranes can also be used.

The polymer concentration can be adjusted by swelling before, during or after this dialysis step referred to as purification step.

Surprisingly, it has been shown by the applicant that the dialysis technique can be diverted from its purification objective and be used to introduce an organic compound within a hydrogel, during a dialysis step, and more precisely by the introduction of said at least one organic compound within the dialysis solvent, namely as constituent of the dialysis solution.

In the remainder of the description, the liquid used to supply the dialysis will be referred to as the dialysis solution; it consists of the dialysis solvent and compounds in solution.

The solution at equilibrium in the gel inside the membrane will be referred to as being the retentate.

The solution, often referred to as dialysate, which is collected outside of the membrane will be referred to as the diffusate in order to avoid any confusion.

By this method, the dialysis solution is no longer considered to be only a washing or dilution liquid but also to be an organic compound supply liquid.

Moreover, it has been shown that by an incorporation method corresponding to the invention, the organic compound has been distributed perfectly homogeneously (without requiring a particular homogenization step), and at a perfectly predictable concentration at most equal to the same concentration as in the dialysis solution.

More generally, all the difficulties generated by the addition of an organic compound in the hydrogel, described in part above, are overcome by means of the invention.

The present invention relates to a method for incorporating at least one organic compound within a hydrogel, characterized in that said incorporation is carried out by dialysis, said organic compound being solubilized in the dialysis solution at a concentration equal to or greater than the target concentration.

In an embodiment, said organic compound is solubilized in the dialysis solution at a concentration equal to the target concentration.

In an embodiment, said incorporation method can be carried out as a step consecutive to and/or concomitant with a hydration step in a method for preparing a hydrogel.

In an embodiment, said method further comprises at least the steps of:
a) crosslinking in the presence of a crosslinking agent,
b) purification and swelling.

In an embodiment, the method for preparing a hydrogel, after said incorporation method is carried out, further comprises a sterilization step.

In an embodiment, the method for preparing a hydrogel, after the purification and swelling step, further comprises a step of mixing at least two different crosslinked gels.

In an embodiment, the method for preparing a hydrogel, after the purification and swelling step, further comprises a step for incorporating, by mixing with said crosslinked polymer, a solution of non-crosslinked polymer.

In an embodiment, said incorporation method can be carried out on previously dehydrated crosslinked gels, after a rehydration step.

The dialysis solution is water or an aqueous solution which can further comprise its mineral salts.

In an embodiment, the dialysis solution comprises sodium chloride.

In an embodiment, the dialysis solution comprises a pH buffer.

In an embodiment, the dialysis solution is a pH buffer solution.

In an embodiment, the dialysis solution is a pH buffer solution selected from the group consisting of phosphate buffers, citrate buffers, borate buffers, lactate buffers, carbonate buffers, acetate buffers and mixtures thereof, said phosphates, citrates, borates, lactates, carbonates or acetates being in acid form or in salified form. When they are in salified form, the counter-ions are preferably selected from the alkali ions such as the sodium ion ($Na^+$) or the potassium ion ($K^+$) or the lithium ion ($Li^+$).

In an embodiment, the dialysis solution is a phosphate buffer solution.

In an embodiment, the dialysis solution is a citrate buffer solution.

In an embodiment, the dialysis solution is a borate buffer solution.

In an embodiment, the dialysis solution is a lactate buffer solution.

In an embodiment, the dialysis solution is a polysaline solution.

In an embodiment, the target concentration of organic compound, namely in the gel after incorporation, is from 0.01 to 500 mg/g.

In an embodiment, said dialysis is carried out at a temperature from +2° C. to 40° C.

In an embodiment, said dialysis is carried out at a temperature from 5° C. to 15° C.

In an embodiment, said dialysis is carried out using a membrane, the cut-off threshold (MWCO-Molecular weight cut-off) of which is from 1 to 200 kDa.

In an embodiment, the MWCO is from 6 to 50 kDa ($6 \leq MCWO \leq 50$ kDa).

In an embodiment, the MWCO is from 12 to 14 kDa ($12 \leq MCWO \leq 14$ kDa).

In an embodiment, said dialysis is carried out in a closed environment.

In an embodiment, said dialysis ranging from 2 to 10 successive dialysis solution baths, each bath having a volume from 1 to 50 times that of the hydrogel in which the organic compound is incorporated.

In an embodiment, said dialysis ranging from 4 to 6 successive baths of dialysis solution, each bath having a volume from 8 to 12 times that of the hydrogel in which the organic compound is incorporated.

In an embodiment, said dialysis is carried out continuously by implementation of a continuous flow of dialysis solution through the hydrogel and the membrane.

In an embodiment, said dialysis ranging from 2 to 10 successive passes of dialysis solution, each pass having a volume from 1 to 400 times that of the hydrogel in which the organic compound is incorporated.

The dialysis is carried out until the concentration of organic compound in the hydrogel is equal, taking into account the uncertainty of the measurement of the concentration, to the target concentration which is at most that of the dialysis solution.

In an embodiment, the dialysis is carried out until the qualitative and quantitative compositions of the dialysis solution, of the retentate and of the diffusate (dialysate) are at equilibrium and thus until the concentration of organic compound in the hydrogel is equal, taking into account the uncertainty of the measurement of the concentration, to the concentration of the dialysis solution.

The qualitative and quantitative composition of the hydrogel after dialysis is called target composition, the concentrations of the different constituents are called target concentrations.

In an embodiment, the method is characterized in that the at least one organic compound is selected from the group consisting of the antioxidants.

The antioxidants, besides the antioxidant properties with respect to the constituents of the hydrogel matrix, have remarkable anti-aging effects on the epidermal keratinocytes, the endothelial cells and the dermal fibroblasts.

In an embodiment, the antioxidant is selected from the group of the polyols.

In an embodiment, the polyol is selected from the group comprising glycerol, sorbitol, propylene glycol, xylitol, mannitol, erythritol, maltitol and lactitol.

In an embodiment, the polyol is selected from the group consisting of mannitol, sorbitol, maltitol and glycerol, alone or in a mixture.

In an embodiment, the polyol is selected from the group consisting of mannitol, sorbitol and maltitol, alone or in a mixture.

In an embodiment, the polyol is mannitol.
In an embodiment, the polyol is sorbitol.
In an embodiment, the polyol is maltitol.
In an embodiment, the polyol is glycerol.
In an embodiment, the polyol is a mixture of mannitol and sorbitol.

In an embodiment, the antioxidant is selected from the group of the vitamin C derivatives.

In an embodiment, the vitamin C derivative is selected from the group comprising magnesium ascorbyl phosphate, sodium ascorbyl phosphate, ascorbyl-2-glucoside.

In an embodiment, the antioxidant is selected from the group of the vitamin E derivatives and the tocopherols.

In an embodiment, the antioxidant is selected from the group of the carotenoids and the retinoids and derivatives thereof.

In an embodiment, the carotenoids and the retinoids and derivatives thereof are selected from the group comprising retinol, retinoic acid, retinal, retinol esters and carotene.

In an embodiment, the antioxidant is selected from the group of the pseudo-tripeptides.

In an embodiment, the pseudo-tripeptide is glutathione.

In an embodiment, the antioxidant is selected from the different forms of coenzyme Q10, ubiquinone or ubiquinol.

In an embodiment, the concentration by weight of antioxidant in the dialysis solution is from 0.01 mg/g to 200 mg/g.

In an embodiment, the concentration by weight of antioxidant in the dialysis solution is from 0.01 mg/g to 100 mg/g.

In an embodiment, the concentration by weight of polyol in the dialysis solution is from 0.01 mg/g to 100 mg/g.

In an embodiment, the concentration by weight of polyol in the dialysis solution is from 0.01 mg/g to 50 mg/g.

In an embodiment, the concentration by weight of polyol in the dialysis solution is from 10 to 40 mg/g.

In an embodiment, the concentration by weight of polyol in the dialysis solution is from 15 to 30 mg/g.

In an embodiment, the concentration by weight of polyol in the dialysis solution is from 15 to 25 mg/g.

In an embodiment, the concentration by weight of polyol in the dialysis solution is from 20 to 40 mg/g.

In an embodiment, the concentration by weight of polyol in the dialysis solution is from 20 to 30 mg/g.

In an embodiment, the concentration by weight of polyol in the dialysis solution is from 25 to 35 mg/g.

In an embodiment, the concentration by weight of polyol in the dialysis solution is 35 mg/g.

In an embodiment, the polyol is mannitol and the concentration by weight of mannitol in the dialysis solution is from 10 to 40 mg/g.

In an embodiment, the polyol is mannitol and the concentration by weight of mannitol in the dialysis solution is from 15 to 30 mg/g.

In an embodiment, the polyol is mannitol and the concentration by weight of mannitol in the dialysis solution is from 15 to 25 mg/g.

In an embodiment, the polyol is mannitol and the concentration by weight of mannitol in the dialysis solution is from 20 to 40 mg/g.

In an embodiment, the polyol is mannitol and the concentration by weight of mannitol in the dialysis solution is from 25 to 35 mg/g.

In an embodiment, the polyol is mannitol and the concentration by weight of mannitol in the dialysis solution is 35 mg/g.

In an embodiment, the polyol is sorbitol and the concentration by weight of sorbitol in the dialysis solution is from 10 to 40 mg/g.

In an embodiment, the polyol is sorbitol and the concentration by weight of sorbitol in the dialysis solution is from 15 to 30 mg/g.

In an embodiment, the polyol is sorbitol and the concentration by weight of sorbitol in the dialysis solution is from 15 to 25 mg/g.

In an embodiment, the polyol is sorbitol and the concentration by weight of sorbitol in the dialysis solution is from 20 to 40 mg/g.

In an embodiment, the polyol is sorbitol and the concentration by weight of sorbitol in the dialysis solution is from 25 to 35 mg/g.

In an embodiment, the polyol is sorbitol and the concentration by weight of sorbitol in the dialysis solution is 35 mg/g.

In an embodiment, the polyol is maltitol and the concentration by weight of maltitol in the dialysis solution is from 10 to 40 mg/g.

In an embodiment, the polyol is maltitol and the concentration by weight of maltitol in the dialysis solution is from 15 to 30 mg/g.

In an embodiment, the polyol is maltitol and the concentration by weight of maltitol in the dialysis solution is from 15 to 25 mg/g.

In an embodiment, the polyol is maltitol and the concentration by weight of maltitol in the dialysis solution is from 20 to 40 mg/g.

In an embodiment, the polyol is maltitol and the concentration by weight of maltitol in the dialysis solution is from 25 to 35 mg/g.

In an embodiment, the polyol is maltitol and the concentration by weight of maltitol in the dialysis solution is 35 mg/g.

In an embodiment, the polyol is glycerol and the concentration by weight of glycerol in the dialysis solution is from 10 to 40 mg/g.

In an embodiment, the polyol is glycerol and the concentration by weight of glycerol in the dialysis solution is from 15 to 30 mg/g.

In an embodiment, the polyol is glycerol and the concentration by weight of glycerol in the dialysis solution is from 15 to 25 mg/g.

In an embodiment, the polyol is glycerol and the concentration by weight of glycerol in the dialysis solution is from 20 to 40 mg/g.

In an embodiment, the polyol is glycerol and the concentration by weight of glycerol in the dialysis solution is from 25 to 35 mg/g.

In an embodiment, the polyol is glycerol and the concentration by weight of glycerol in the dialysis solution is 35 mg/g.

In an embodiment, the method is characterized in that the at least one organic compound is selected from the group consisting of local anesthetics.

In an embodiment, the local anesthetic is selected from the group of the amino esters.

In an embodiment, the amino ester is selected from the group comprising procaine, benzocaine, chloroprocaine and tetracaine in the form of a base or a salt, for example, in hydrochloride form.

In an embodiment, the local anesthetic is selected from the group of the aminoamide.

In an embodiment, the aminoamide is selected from the group comprising lidocaine, mepivacaine, prilocaine, articaine, aptocaine, bupivacaine, etidocaine and ropivacaine in the form of a base or a salt, for example, in hydrochloride form.

In an embodiment, the local anesthetic is selected from the group of the amino ethers.

In an embodiment, the amino ether is selected from the group comprising diamocaine and the pramocaine in the form of a base or a salt, for example, in hydrochloride or cyclamate form.

In an embodiment, the amino ether is selected from the group consisting of lidocaine, mepivacaine, and salts thereof and isolated isomers thereof.

In an embodiment, the amino ether is lidocaine.

In an embodiment, the amino ether is lidocaine or one of the pharmaceutically acceptable salts thereof.

In an embodiment, the amino ether is lidocaine hydrochloride.

In an embodiment, the amino ether is mepivacaine.

In an embodiment, the amino ether is mepivacaine or one of the pharmaceutically acceptable salts thereof.

In an embodiment, the amino-ether is selected from the group consisting of racemic mepivacaine hydrochloride, racemic mepivacaine hydrochloride, (r)-mepivacaine hydrochloride, (s)-mepivacaine hydrochloride, (r)-mepivacaine and (s)-mepivacaine, or one of the pharmaceutically acceptable salts thereof.

In an embodiment, the amino ether is mepivacaine hydrochloride.

In an embodiment, the amino ether is (r)-mepivacaine hydrochloride.

In an embodiment, the amino ether is (s)-mepivacaine hydrochloride.

In an embodiment, the amino ether is racemic mepivacaine hydrochloride.

In an embodiment, the amino ether is (r)-mepivacaine.

In an embodiment, the amino ether is (s)-mepivacaine.

In an embodiment, the amino ether is racemic mepivacaine.

In an embodiment, the local anesthetic is dyclonine in the form of a base or a salt, for example, in hydrochloride form.

In an embodiment, the local anesthetic is chlorobutanol.

In an embodiment, the local anesthetic is guafecainol.

In an embodiment, the local anesthetic is polidocanol.

In an embodiment, the concentration by weight of local anesthetic in the dialysis solution is from 0.01 mg/g to 10 mg/g.

In an embodiment, the concentration by weight of local anesthetic in the dialysis solution is from 0.01 to 7 mg/g.

In an embodiment, the concentration by weight of local anesthetic in the dialysis solution is from 0.01 to 5 mg/g.

In an embodiment, the concentration by weight of local anesthetic in the dialysis solution is from 0.01 to 2 mg/g.

In an embodiment, the concentration by weight of local anesthetic in the dialysis solution is from 0.01 to 1 mg/g.

In an embodiment, the concentration by weight of local anesthetic in the dialysis solution is from 0.01 to 0.7 mg/g.

In an embodiment, the concentration by weight of local anesthetic in the dialysis solution is from 0.01 to 0.5 mg/g.

In an embodiment, the concentration by weight of local anesthetic in the dialysis solution is 0.3 mg/g.

In an embodiment, the local anesthetic is lidocaine and the concentration by weight of lidocaine in the dialysis solution is from 0.01 mg/g to 10 mg/g.

In an embodiment, the local anesthetic is lidocaine and the concentration by weight of lidocaine in the dialysis solution is from 0.01 to 7 mg/g.

In an embodiment, the local anesthetic is lidocaine and the concentration by weight of lidocaine in the dialysis solution is from 0.01 to 5 mg/g.

In an embodiment, the local anesthetic is lidocaine and the concentration by weight of lidocaine in the dialysis solution is from 0.01 to 2 mg/g.

In an embodiment, the local anesthetic is lidocaine and the concentration by weight of lidocaine in the dialysis solution is from 0.01 to 1 mg/g.

In an embodiment, the local anesthetic is lidocaine and the concentration by weight of lidocaine in the dialysis solution is from 0.01 to 0.7 mg/g.

In an embodiment, the local anesthetic is lidocaine and the concentration by weight of lidocaine in the dialysis solution is from 0.01 to 0.5 mg/g.

In an embodiment, the local anesthetic is lidocaine and the concentration by weight of lidocaine in the dialysis solution is 0.3 mg/g.

In an embodiment, the local anesthetic is mepivacaine and the concentration by weight of mepivacaine in the dialysis solution is from 0.01 mg/g to 10 mg/g.

In an embodiment, the local anesthetic is mepivacaine and the concentration by weight of mepivacaine in the dialysis solution is from 0.01 to 7 mg/g.

In an embodiment, the local anesthetic is mepivacaine and the concentration by weight of mepivacaine in the dialysis solution is from 0.01 to 5 mg/g.

In an embodiment, the local anesthetic is mepivacaine and the concentration by weight of mepivacaine in the dialysis solution is from 0.01 to 2 mg/g.

In an embodiment, the local anesthetic is mepivacaine and the concentration by weight of mepivacaine in the dialysis solution is from 0.01 to 1 mg/g.

In an embodiment, the local anesthetic is mepivacaine and the concentration by weight of mepivacaine in the dialysis solution is from 0.01 to 0.7 mg/g.

In an embodiment, the local anesthetic is mepivacaine and the concentration by weight of mepivacaine in the dialysis solution is from 0.01 to 0.5 mg/g.

In an embodiment, the local anesthetic is mepivacaine and the concentration by weight of mepivacaine in the dialysis solution is 0.3 mg/g.

In an embodiment, the local anesthetic is prilocaine.

In an embodiment, the local anesthetic is prilocaine or one of the pharmaceutically acceptable salts thereof.

In an embodiment, the local anesthetic is prilocaine hydrochloride.

In an embodiment, the local anesthetic is prilocaine and the concentration by weight of prilocaine in the dialysis solution is from 0.01 mg/g to 10 mg/g.

In an embodiment, the local anesthetic is prilocaine and the concentration by weight of prilocaine in the dialysis solution is from 0.01 to 7 mg/g.

In an embodiment, the local anesthetic is prilocaine and the concentration by weight of prilocaine in the dialysis solution is from 0.01 to 5 mg/g.

In an embodiment, the local anesthetic is prilocaine and the concentration by weight of prilocaine in the dialysis solution is from 0.01 to 2 mg/g.

In an embodiment, the local anesthetic is prilocaine and the concentration by weight of prilocaine in the dialysis solution is from 0.01 to 1 mg/g.

In an embodiment, the local anesthetic is prilocaine and the concentration by weight of prilocaine in the dialysis solution is from 0.01 to 0.7 mg/g.

In an embodiment, the local anesthetic is prilocaine and the concentration by weight of prilocaine in the dialysis solution is from 0.01 to 0.5 mg/g.

In an embodiment, the local anesthetic is prilocaine and the concentration by weight of prilocaine in the dialysis solution is 0.3 mg/g.

In an embodiment, method is characterized in that the at least one organic compound is selected from the group consisting of the vitamins.

In an embodiment, the vitamins are selected from the group comprising retinol, thiamine, riboflavin, nicotinamide, dexpenthenol, pyridoxine, ascorbic acid, ergocalciferol, tocopherol, biotin and folic acid, alone or in a mixture.

In an embodiment, the concentration of vitamins is from 0.01 to 200 mg/g.

In an embodiment, the concentration of vitamins is from 0.1 to 100 mg/g.

In an embodiment, the concentration of vitamins is from 0.5 to 50 mg/g.

In an embodiment, the method is characterized in that the at least one of organic compound is selected from the group consisting of the amino acids.

In an embodiment, the method is characterized in that the at least one of organic compounds is selected from the group consisting of the amino acids, the semi-essential amino acids and/or the non-essential amino acids, alone or in a mixture.

In an embodiment, the amino acids are selected from the group of the essential amino acids.

In an embodiment, the essential amino acids are selected from the group consisting of isoleucine, leucine, lysine, methionine, phenylaniline, threonine, tryptophan and valine, alone or in a mixture.

In an embodiment, the amino acids are selected from the group of the semi-essential amino acids.

In an embodiment, the semi-essential amino acids are selected from the group consisting of arginine and histidine, alone or in a mixture.

In an embodiment, the amino acids are selected from the group of the non-essential amino acids.

In an embodiment, the non-essential amino acids are selected from the group consisting of alanine, asparagine, aspartic acid, cysteine, glutamine, glutamic acid, glycine, proline, serine, tyrosine, alone or in a mixture.

In an embodiment, the amino acids are selected from the group comprising hydroxyproline, taurine and ornithine, alone or in a mixture.

In an embodiment, the concentration of amino acids is from 0.01 to 150 mg/g.

In an embodiment, the concentration of amino acids is from 0.1 to 100 mg/g.

In an embodiment, the concentration of amino acids is from 0.5 to 50 mg/g.

In an embodiment, the method is characterized in that the at least one organic compound is selected from the group consisting of the vasoconstrictors.

In an embodiment, the vasoconstrictors are selected from the group of consisting of naphazoline, epinephrine, methoxamine, methyl norepinephrine, norepinephrine, oxymethazoline, phenylephrine, pseudo ephedrine, synephrine, cirazoline or xylometazoline.

In an embodiment, the concentration of vasoconstrictors is from 0.01 to 3 mg/g.

In an embodiment, the method is characterized in that the at least one organic compound is selected from the group consisting of vasodilators.

In an embodiment, the vasodilators are selected from the group of adenosine, nicotinic acid, minoxidil and diazoxide, alone or in a mixture.

In an embodiment, the concentration of vasodilators is from 0.01 to 10 mg/g.

In an embodiment, the method is characterized in that the at least one organic compound is selected from the group consisting of the antihemorrhagic or hemostatic agents.

In an embodiment, the antihemorrhagic or hemostatic agents are selected from the group comprising aminocaproic acid or tranexamic acid, alone or in a mixture.

In an embodiment, the concentration of antihemorrhagic or hemostatic agents is from 0.01 to 5 mg/g.

In an embodiment, the method is characterized in that the at least one organic compound is selected from the group consisting of the nonsteroidal anti-inflammatories.

In an embodiment, the anti-inflammatories are selected from the group comprising the salicylate anti-inflammatories, the propionic derivatives, the indole derivatives, the pyrazole derivatives, the oxicams, the coxibs.

In an embodiment, the anti-inflammatories are selected from the group consisting of diclofenac, nimesulfide, niflumic acid, mefenamic acid and nabumetone, alone or in a mixture.

In an embodiment, the anti-inflammatories are selected from the group of the salicylate anti-inflammatories comprising diflunisal, benorilate and aspirin, alone or in a mixture.

In an embodiment, the anti-inflammatories are selected from the group of the propionic derivatives comprising alminoprofen, ketoprofen, ibuprofen, naproxen, flurbiprofen and tiaprofenic acid, alone or in a mixture.

In an embodiment, the anti-inflammatories are selected from the group of the indole derivatives comprising indomethacin, sulindac and etodolac, alone or in a mixture.

In an embodiment, the anti-inflammatories are selected from the group of the pyrazole derivatives notably comprising phenylbutazone.

In an embodiment, the anti-inflammatories are selected from the group of the oxicams comprising piroxicam, tenoxicam and meloxicam, alone or in a mixture.

In an embodiment, the anti-inflammatories are selected from the group of the coxibs comprising celecoxib, etoricoxib and rofecoxib, alone or in a mixture.

In an embodiment, the concentration of nonsteroidal anti-inflammatories is from 0.01 to 2000 mg/g.

In an embodiment, the concentration of nonsteroidal anti-inflammatories is from 0.1 to 1000 mg/g.

In an embodiment, the concentration of nonsteroidal anti-inflammatories is from 0.5 to 500 mg/g.

In an embodiment, the method is characterized in that the at least one organic compound is selected from the group consisting of antimicrobial agents.

In an embodiment, the antimicrobial agents are selected from the group comprising gentamycin, silver sulfadiazine, metronidazole, fucidin, bacitracin, eosin, iodinated povidone, copper gluconate, zinc gluconate, manganese gluconate or salts thereof, alone or in a mixture.

In an embodiment, the concentration of antimicrobial agents is from 0.1 to 200 mg/g.

In an embodiment, the concentration of antimicrobial agents is from 0.5 to 100 mg/g.

In an embodiment, the method is characterized in that the at least one organic compound is selected from the group consisting of glycosides and derivatives thereof.

In an embodiment, the glycosides are selected from the group comprising D-glucopyranose, 1,4-glycoside, esculin, hesperidin, diosmin, arbutin, skimmin or aloin, alone or in a mixture.

In an embodiment, the concentration of glycosides is from 0.1 to 200 mg/g.

In an embodiment, the concentration of glycosides is from 0.5 to 100 mg/g.

In an embodiment, the method is characterized in that the at least one organic compound is selected from the group consisting of hydrating agents or tissue regenerating agents.

In an embodiment, the hydrating agents or tissue regenerating agents are selected from the group consisting of the macro-elements.

In an embodiment, the macro-elements are selected from the group comprising the iron, calcium, copper, zinc, manganese, magnesium or potassium gluconates, trimethylsilanol, trimethylsilanolate, potassium trimethylsilanolate, methylsilanol mannuronate, monoethyltrisilanol sodium orthohydroxybenzoate salts or in mixtures.

In an embodiment, the hydrating agents or tissue regenerating agents are selected from the group consisting of the essential amino acids.

In an embodiment, the essential amino acids are selected from the group consisting of isoleucine, leucine, lysine, methionine, phenylaniline, threonine, tryptophan and valine, alone or in a mixture.

In an embodiment, the hydrating agents or tissue regenerating agents are selected from the group consisting of the semi-essential amino acids.

In an embodiment, the semi-essential amino acids are selected from the group consisting of arginine and histidine, alone or in a mixture.

In an embodiment, the hydrating agents or tissue regenerating agents are selected from the group consisting of the non-essential amino acids.

In an embodiment, the non-essential amino acids are selected from the group consisting of alanine, asparagine, aspartic acid, cysteine, glutamine, glutamic acid, glycine, proline, serine, tyrosine, alone or in a mixture.

In an embodiment, the amino acids are selected from the group comprising hydroxyproline, taurine and ornithine, alone or in a mixture.

In an embodiment, the hydrating agents or tissue regenerating agents are selected from the group consisting of the vitamins.

In an embodiment, the vitamins are selected from the group consisting of retinol, thiamine, riboflavin, nicotinamide, adenine, calcium pantothenate, pyridoxine, inositol, biotin, folic acid, para-aminobenzoic acids, cobalamin, vitamin C, choline chloride, alone or in mixtures.

In an embodiment, the hydrating agents or tissue regenerating agents are selected from the group consisting of the nucleic acids.

In an embodiment, the nucleic acids are selected from the group consisting of deoxyadenosine, deoxycytidine, deoxyguanosine, deoxythymidine, methyl cytosine, alone or in mixtures.

In an embodiment, the hydrating agents or tissue regenerating agents are selected from the group consisting of the coenzymes.

In an embodiment, the coenzymes are selected from the group consisting of thiamine pyrophosphate, coenzyme A, FAD, NAD, NADP, UTP, alone or in mixtures.

In an embodiment, the hydrating agents or tissue regenerating agents are selected from the group consisting of deoxythymidine, glutathione, sodium pyruvate, lipoic acid and putrescine, alone or in a mixture.

In an embodiment, the tissue regenerating agents are selected from the group consisting of the macro-elements.

In an embodiment, the macro-elements are selected from the group comprising the iron, calcium, copper, zinc, manganese, magnesium or potassium gluconates, trimethylsilanol, trimethylsilanolate, potassium trimethylsilanolate, methylsilanol mannuronate, monoethyltrisilanol sodium orthohydroxybenzoate salts or in mixtures.

In an embodiment, the concentration of hydrating agents or tissue regenerating agents is from 0.01 to 500 mg/g.

In an embodiment, the concentration of hydrating agents or tissue regenerating agents is from 0.1 to 200 mg/g.

In an embodiment, the method is characterized in that at least one organic compound is selected from the group of the antioxidants, and an organic compound is selected from the group of the local anesthetics.

In an embodiment, the antioxidant is selected from the group of the polyols and the local anesthetic is selected from the group of the amino amides.

In an embodiment, the method is characterized in that at least one organic compound is selected from the group of the antioxidants, at least one organic compound is selected from the group of the vitamins, and at least one compound is selected from the group of the tissue regenerating agents.

In an embodiment, the method is characterized in that at least one organic compound is selected from the group of the amino acids, at least one organic compound is selected from the group of the vitamins, and at least one compound is selected from the group of the tissue regenerating agents.

In an embodiment, the method is characterized in that at least one organic compound is selected from the group of the antioxidants, at least one organic compound is selected from the group of the amino acids, at least one organic compound is selected from the group of the vitamins, and at least one compound is selected from the group of the tissue regenerating agents.

Said hydrogel consists of at least one polysaccharide selected from the group consisting of hyaluronic acid, keratan, heparin, cellulose, cellulose derivatives (notably hydroxypropyl cellulose, hydroxypropyl methylcellulose, ethyl methyl cellulose, carboxymethyl cellulose), alginic acid, xanthan, carrageenan, chitosan, chondroitin, heparosan and the biologically acceptable salts thereof, alone or in mixture.

In an embodiment, said polysaccharide is hyaluronic acid.

In an embodiment, said polysaccharide is hyaluronic acid or one of the salts thereof, alone or in a mixture.

In an embodiment, said polysaccharide is hyaluronic acid in the form of a sodium or potassium salt.

In an embodiment, said polysaccharide is hyaluronic acid in the form of a sodium salt.

In an embodiment, said polysaccharide is crosslinked hyaluronic acid or one of the salts thereof, alone or in a mixture.

In an embodiment, said polysaccharide is crosslinked hyaluronic acid or one of the salts thereof, alone or in a mixture, and in that said crosslinking is carried out by means of at least one crosslinking agent.

In an embodiment, said polysaccharide is crosslinked hyaluronic acid or one of the salts thereof, alone or in a mixture, and in that said crosslinking is carried out by means of a bi- or polyfunctional crosslinking agent.

In an embodiment, said polysaccharide is crosslinked hyaluronic acid or one of the salts thereof, alone or in a mixture, and in that said crosslinking is carried out by means of at least one bi- or polyfunctional crosslinking agent selected from the group consisting of ethylene glycol diglycidyl ether, butanediol diglycidyl ether (BDDE), polyglycerol polyglycidyl ether, polyethylene glycol diglycidyl ether, polypropylene glycol diglycidyl ether, a bis- or polyepoxy such as 1,2,3,4-diepoxybutane or 1,2,7,8-diepoxyoctane, a dialkyl sulfone, divinyl sulfone, formaldehyde, epichlorohydrin or else glutaraldehyde, the carbodiimides such as, for example, 1-ethyl-3-[3-dimethylaminopropyl]carbodiimide hydrochloride (EDC) or the crosslinking agents based on phosphorus (V) derivatives.

In an embodiment, the phosphorus (V) derivatives are selected from the group comprising the phosphorus halides, phosphorus oxyhalide, the halogen being selected from the group comprising chlorine, bromine or iodine, phosphorus pentoxide and alkali metal trimetaphosphates, the alkali metal being selected from the group comprising sodium and potassium.

In an embodiment, said polysaccharide is crosslinked hyaluronic acid or one of the salts thereof, alone or in a mixture, and in that said crosslinking is carried out by means of at least one bifunctional crosslinking agent which is butanediol diglycidyl ether (BDDE) or 1,2,7,8-diepoxyoctane.

In an embodiment, said polysaccharide is crosslinked hyaluronic acid or one of the salts thereof, alone or in a mixture, and in that said crosslinking is carried out by means of BDDE.

In an embodiment, said polysaccharide is crosslinked hyaluronic acid or one of the salts thereof, alone or in a mixture, and in that said crosslinking is carried out by means of a sodium or potassium trimetaphosphate.

When the polysaccharide and more particularly the hyaluronic acid is crosslinked by means of a crosslinking agent, the crosslinking ratio (x) is calculated theoretically by means of the following formula:

$$X = \frac{\text{number of moles of crosslinking agent introduced into the reaction medium}}{\text{number of moles of repeated units introduced into the reaction medium}}$$

Regarding the hyaluronic acid, the repeated unit is a disaccharide unit.

In an embodiment, the crosslinked hyaluronic acid has a crosslinking ratio x from 0.001 to 0.5.

In an embodiment, the crosslinked hyaluronic acid has a crosslinking ratio x from 0.01 to 0.4.

In an embodiment, the crosslinked hyaluronic acid has a crosslinking ratio x from 0.1 to 0.3.

In an embodiment, the crosslinked hyaluronic acid has a crosslinking ratio x of 0.06.

In an embodiment, the crosslinked hyaluronic acid has a crosslinking ratio x of 0.07.

In an embodiment, the crosslinked hyaluronic acid has a crosslinking ratio x of 0.12.

In an embodiment, said polysaccharide is crosslinked hyaluronic acid or one of the salts thereof, alone or in a mixture.

In an embodiment, said polysaccharide is hyaluronic acid chemically modified by substitution, crosslinked or uncrosslinked, or one of the salts thereof, alone or in a mixture.

In an embodiment, said polysaccharide is double crosslinked hyaluronic acid as described in the patent application WO2000/046253 in the name of Fermentech Medical Limited.

In an embodiment, said polysaccharide is a mixture of hyaluronic acids or one of the salts thereof, crosslinked and uncrosslinked.

In an embodiment, said polysaccharide is a mixture of hyaluronic acids or one of the salts thereof, crosslinked.

In an embodiment, said polysaccharide is a mixture of hyaluronic acids or one of the salts thereof, crosslinked as the one described in the patent application WO2009/071697 in the name of the applicant.

In an embodiment, said polysaccharide is a mixture of hyaluronic acids, obtained by mixing multiple hyaluronic acids, or one of the salts thereof, having different molecular weights before their crosslinking, as described in the patent application WO2004092222 in the name of Cornéal Industrie.

In an embodiment, said polysaccharide is hyaluronic acid or one of the salts thereof, substituted by a group contributing lipophilic or hydrating properties, such as, for example, the substituted hyaluronic acids as described in the patent application FR2983483 in the name of the applicant. Described in this application is a method of simultaneous substitution and crosslinking of a polysaccharide via the hydroxyl functions thereof, in aqueous phase, characterized in that it comprises the following steps: (i) a polysaccharide is available in an aqueous medium, (ii) it is put in the presence of at least one precursor of a substituent, (iii) it is put in the presence of a crosslinking agent, and (iv) the substituted and crosslinked polysaccharide is obtained and isolated. These method steps can be carried out perfectly well in the context of the present invention.

In an embodiment, said polysaccharide is hyaluronic acid or one of the salts thereof, grafted with glycerol, for example, as described in the application WO2017162676 in the name of MERZ.

In an embodiment, the molecular weight mw of the at least one hyaluronic acid is in an interval from 0.01 MDa to 5 MDa.

In an embodiment, the molecular weight mw of the at least one hyaluronic acid is in an interval from 0.1 MDa to 3.5 MDa.

In an embodiment, the molecular weight mw of the at least one hyaluronic acid is in an interval from 1 MDa to 3 MDa.

In an embodiment, the molecular weight mw of the at least one hyaluronic acid is 1 MDa.

In an embodiment, the molecular weight mw of the at least one hyaluronic acid is 3 MDa.

In an embodiment, the concentration of hyaluronic acid [HA] is from 2 mg/g to 50 mg/g of total weight of said hydrogel.

In an embodiment, the concentration of hyaluronic acid [HA] is from 4 mg/g and 40 mg/g of total weight of said hydrogel.

In an embodiment, the concentration of hyaluronic acid [HA] is from 5 mg/g and 30 mg/g of total weight of said hydrogel.

In an embodiment, the concentration of hyaluronic acid [HA] is from 10 mg/g and 30 mg/g of total weight of said hydrogel.

In an embodiment, the concentration of hyaluronic acid [HA] is 20 mg/g of total weight of said hydrogel.

In an embodiment, the hydrogel is sterilized, that is to say it undergoes, after its preparation, a sterilization step, said sterilization step being carried out by heat, by humid heat, by gamma ($\gamma$) radiation, by a beam of accelerated electrons (electron beam) or by sterilizing filtration (0.22 µm) in the case of uncrosslinked hyaluronic acid-based hydrogels.

In an embodiment, said sterilization step is carried out by steam autoclaving.

In an embodiment, the steam autoclaving is carried out at a temperature from 121 to 134° C., for a duration adapted to the temperature.

In an embodiment, the steam autoclaving is carried out at a temperature from 127 to 130° C. for a duration from 1 to 20 min.

In an embodiment, the sterilizing value FO is greater than 1 min at 121° C.

In an embodiment, said sterilization step is carried out by gamma ($\gamma$) radiation.

The intended applications are more particularly the applications which are widely used in the context of injectable viscoelastics and polysaccharides which are used or potentially usable in the following pathologies or treatments:

Aesthetic injections in the face: mesotherapy, wrinkle filling, cutaneous or volumizing defects (Adam's apple, chin, lips);

Volumizing injections in the body: augmentation of the breasts and buttocks, augmentation of the G spot, vaginoplasty, reconstruction of the vaginal lips, increase of the size of the penis;

Treatment of arthrosis, injection into the joint as replacement or as addition to the deficient synovial liquid;

Periurethral injection for the treatment of urinary incontinence due to sphincter insufficiency;

Post-surgical injection to prevent adhesions, notably peritoneal adhesions;

Injection after surgery for presbyopia by scleral incisions with the laser;

Injection into the vitreous cavity;

Injection during cataract surgery;

Injection into the genitals;

Injection for tissue spacing.

More particularly, in aesthetic surgery, as a function of its viscoelastic and persistence properties, the sterilized aqueous composition obtained according to the method of the invention can be used:

- for improving the hydration and the quality of the skin by a cutaneous mesotherapy of the face, neck, neckline or hands. In this case, the product is injected using a needle having a diameter varying from 27 to 32G and lengths varying generally from ⅛" to ½". The composition can be injected either manually or using automatic devices such as injection pens.
- for the filling of fine, medium or deep wrinkles, and it can be injected with needles of fine diameter (mostly 27 gauge to 30G, the lengths generally being ½");
- as volumizing agent with injection either using needles of larger diameter, for example, 25 to 27G gauge, and longer needles (for example, 30 to 40 mm) or using cannulas mostly having a length from 40 to 70 mm and a diameter from 22 to 25G; in this case, its cohesive properties will make it possible to guarantee that it is maintained at the site of the injection.

The sterilized aqueous composition according to the invention generally is extensively used in joint surgery and in dental surgery for filling periodontal pockets, for example.

These examples of use are in no way limiting, the sterilized aqueous composition according to the present invention being more broadly intended for:

- filling volumes;
- generating spaces between certain tissues;
- replacing deficient physiological liquids.

The invention also relates to a kit comprising a sterilized aqueous composition according to the invention, packaged in syringes and sterilized after packaging.

The invention also relates to a kit comprising a sterilized aqueous composition according to the invention, packaged in single-dose bottles and sterilized after packaging.

EXAMPLES

Production of the Gels

Crosslinked Hyaluronic Acid Gels

The gels comprising crosslinked hyaluronic acid are obtained according to the procedure described in the patent application WO 2009/071697 in the name of the applicant from fibers of sodium hyaluronate (NaHA) and butanediol-diglycyidyl ether (BDDE).

Crosslinked and Interpenetrated Hyaluronic Acid Gels

The gels comprising crosslinked and interpenetrated hyaluronic acid are obtained according to the procedure described in the patent application WO 2009/071697 in the name of the applicant.

Co-Crosslinked Hyaluronic Acid Gels

The gels comprising co-crosslinked hyaluronic acid are obtained according to the procedure described in the patent application WO 86/00079 in the name of ALLERGAN.

Sterilization

The compositions thus obtained are packaged in syringes which are sterilized by steam autoclaving (T=121° C., 10 min).

Example 1

Incorporation of Lidocaine in a Hyaluronic Acid Gel by Dialysis.

Fibers of sodium hyaluronate (HA) having a molecular weight of approximately 3000 kDa and containing 12% moisture were hydrated in sodium hydroxide at 0.25N until complete dissolution.

Then the BDDE is introduced into the reaction medium.

The reaction medium is homogenized alternating manual stirring with the spatula and rest for approximately 50 minutes.

The reaction medium consisting of 3 g of sodium hyaluronate, 0.23 g of BDDE and 24.5 g of sodium hydroxide at 0.25N is then introduced for 3 hours into a water bath thermostatted at 50° C. beforehand.

After crosslinking, the reaction medium is neutralized with 5.5 g of HCl 1N and 30 g of phosphate buffer (PBS). After homogenization with the spatula, the pH measured is 7.2.

A saline solution of lidocaine hydrochloride was prepared by dissolving the following compounds:

| | |
|---|---|
| $NaH_2PO_4$, $2H_2O$ | 0.0459 g |
| $Na_2HPO_4$ | 0.2690 g |
| NaCl | 7.99 g |
| Lidocaine hydrochloride | 3.01 g |
| WFI | q.s. 1 L |

This solution has a lidocaine titer of 0.28% and has a pH of 6.8 and an osmolarity of 274 mOsm.

| | | |
|---|---|---|
| Saline solution of lidocaine hydrochloride | pH | 6.8 |
| | Osmolarity (mOsm) | 274 |
| | Lidocaine titer | 0.28% |

10 g of crosslinked HA gel are loaded on a tubular dialysis membrane with a cut-off threshold of 12-14 kD and dialyzed at +4° C. against 90 g of saline solution of lidocaine hydrochloride. 6 successive baths of saline solution are implemented for a total duration of 74H29.

The final concentration of HA is 21 mg/g, the pH is 6.7, and the osmolarity is 292 mOsm. The concentration of lidocaine in the gel after dialysis was determined by UV assay according to a validated internal method. The lidocaine titer is 0.3%.

| | | |
|---|---|---|
| Crosslinked HA Gel after dialysis | [HA] (mg/g) | 21.2 |
| | pH | 6.7 |
| | Osmolarity (mOsm) | 292 |
| | Lidocaine titer | 0.31% |

Example 2

Incorporation of Mannitol in a Hyaluronic Acid Gel by Dialysis.

Fibers of sodium hyaluronate (HA) having a molecular weight of approximately 3000 kDa and containing 10.3% moisture were hydrated in sodium hydroxide at 0.25N until complete dissolution.

Then the BDDE is introduced into the reaction medium.

The reaction medium is homogenized alternating mechanical stirring and rest for approximately 50 minutes.

The reaction medium consisting of 251 g of sodium hyaluronate, 19 g of BDDE and 1751 g of sodium hydroxide at 0.25N is then introduced for 3 hours into a water bath thermostatted at 50° C. beforehand.

After crosslinking, the reaction medium is neutralized with 405 g of HCl 1N and 2702 g of phosphate buffer (PBS) and mechanically homogenized. The gel obtained is identified as M1.

In parallel, fibers of sodium hyaluronate (HA) having a molecular weight of approximately 1000 kDa and containing 8% moisture were hydrated in sodium hydroxide at 0.25N until complete dissolution.

Then the BDDE is introduced into the reaction medium.

The reaction medium is homogenized alternating mechanical stirring and rest for approximately 50 minutes.

The reaction medium consisting of 245 g of sodium hyaluronate, 12 g of BDDE and 1309 g of sodium hydroxide at 0.25N is then introduced for 2 hours 45 minutes into a water bath thermostatted at 50° C. beforehand.

After crosslinking, the reaction medium is neutralized with 300 g of HCl 1N and 2701 g of phosphate buffer (PBS) and mechanically homogenized. The gel obtained is identified as M2.

A saline solution of mannitol was prepared by dissolving the following compounds:

| | |
|---|---|
| $NaH_2PO_4$, $2H_2O$ | 5.4 g |
| $Na_2HPO_4$ | 67.6 g |
| NaCl | 240 g |
| Mannitol | 4200 g |
| WFI | q.s. 120 L |

This solution has a mannitol titer of 35.0 g/L.

5468 g of M1 are loaded on a tubular dialysis membrane with a cut-off threshold of 12-14 kD and dialyzed at +10° C. against the saline solution of mannitol in a ratio of 1/11. 4 successive baths of saline solution of mannitol are implemented for a total duration of 40H33.

In parallel, 5426 g of M2 are loaded into a tubular dialysis membrane with a cut-off threshold of 12-14 kD and dialyzed at +10° C. against the saline solution of mannitol in a ratio of 1/11. 4 successive baths of saline solution of mannitol are implemented for a total duration of 40H33.

After the two dialyses, 3234 g of dialyzed M1 and 3234 g of dialyzed M2 are mixed with 2134 g of saline solution of mannitol. After mechanical homogenization and debubbling, the gel obtained is distributed into 1-mL syringes and then sterilized with steam at 127° C. with a FO of 21 minutes.

The mannitol is assayed by HPLC-RID according to a validated internal method. The mannitol titer is 30.5 g/L.

In conclusion, the concentration of active compound in each gel corresponds to the concentration of said active ingredient within the dialysis liquid used.

The invention claimed is:

1. A method for incorporating at least one organic compound within a hydrogel, wherein the incorporation is carried out by dialysis, the organic compound being solubilized in the dialysis solution at a concentration equal to or greater than the target concentration of organic compound in the gel after incorporation, the target concentration being from 0.01 to 500 mg/g.

2. The method according to claim 1, wherein the dialysis solution is water or an aqueous solution which can further comprise its mineral salts.

3. The method according to claim 1, wherein the dialysis solution further comprises sodium chloride.

4. The method according to claim 1, wherein the dialysis solution further comprises a pH buffer.

5. The method according to claim 4, wherein the pH buffer is selected from the group consisting of phosphate buffers, citrate buffers, borate buffers, lactate buffers, carbonate buffers, acetate buffers and mixtures thereof, said phosphates, citrates, borates, lactates, carbonates or acetates being in acid form or in salified form.

6. The method according to claim 1, wherein the dialysis is carried out at a temperature from 2 to 40° C.

7. The method according to a claim 1, wherein the dialysis is carried out using a membrane, the cut-off threshold (MWCO) of which is from 1 to 200 kD (1≤MCWO≤200 kDa).

8. The method according to claim 1, wherein the dialysis is carried out in a closed environment.

9. The method according to claim 1, wherein the dialysis is carried out continuously by implementation of a continuous flow of dialysis solution through the hydrogel and the membrane.

10. The method according to claim 1, wherein at least one organic compound is selected from the group consisting of the antioxidants.

11. The method according to claim 10, wherein the concentration by weight of antioxidant in the dialysis solution is from 0.01 mg/g to 200 mg/g.

12. The method according to claim 1, wherein at least one organic compound is selected from the group consisting of the local anesthetics.

13. The method according to claim 12, wherein the concentration by weight of local anesthetic in the dialysis solution is from 0.01 mg/g to 10 mg/g.

14. The method according to claim 1, wherein at least one organic compound is selected from the group consisting of the vitamins.

15. The method according to claim 1, wherein at least one organic compound is selected from the group consisting of the amino acids.

16. The method according to claim 1, wherein at least one organic compound is selected from the group consisting of the vasoconstrictors.

17. The method according to claim 1, wherein at least one organic compound is selected from the group consisting of the vasodilators.

18. The method according to claim 1, wherein at least one organic compound is selected from the group consisting of the antihemorrhagic or hemostatic agents.

19. The method according to claim 1, wherein at least one organic compound is selected from the group consisting of nonsteroidal anti-inflammatories.

20. The method according to claim 1, wherein at least one organic compound is selected from the group consisting of the antimicrobial agents.

21. The method according to claim 1, wherein at least one organic compound is selected from the group consisting of the glycosides and derivatives thereof.

22. The method according to claim 1, wherein at least one organic compound is selected from the group consisting of the hydrating agents or tissue regenerating agents.

23. The method according to claim 1, wherein the hydrogel consists of at least one polysaccharide selected from the group consisting of hyaluronic acid, keratan, heparin, cellulose, cellulose derivatives, alginic acid, xanthan, carrageenan, chitosan, chondroitin, heparosan and the biologically acceptable salts thereof, alone or in mixture.

24. The method according to claim 23, wherein the polysaccharide is hyaluronic acid.

* * * * *